(12) United States Patent
Cocks et al.

(10) Patent No.: US 11,125,294 B2
(45) Date of Patent: Sep. 21, 2021

(54) SYSTEMS AND METHODS FOR REDUCING OXIDATION OF FRICTION DISKS

(71) Applicant: GOODRICH CORPORATION, Charlotte, NC (US)

(72) Inventors: Peter A. T. Cocks, South Glastonbury, CT (US); Thomas P Filburn, Granby, CT (US); Ying She, East Hartford, CT (US); Haralambos Cordatos, Colchester, CT (US); Zissis A. Dardas, Worcester, MA (US); William P. May, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 153 days.

(21) Appl. No.: 16/362,061

(22) Filed: Mar. 22, 2019

(65) Prior Publication Data
US 2020/0300321 A1    Sep. 24, 2020

(51) Int. Cl.
| *F16D 65/853* | (2006.01) |
| *B64C 25/42* | (2006.01) |
| *F16D 65/78* | (2006.01) |
| *F16D 121/02* | (2012.01) |

(52) U.S. Cl.
CPC ............ *F16D 65/853* (2013.01); *B64C 25/42* (2013.01); *F16D 2065/783* (2013.01); *F16D 2121/02* (2013.01); *F16D 2200/0052* (2013.01)

(58) Field of Classification Search
CPC ...... F16D 65/853; F16D 65/78; F16D 65/188; F16D 2065/783; F16D 2065/784; F16D 2121/02; F16D 2200/0052; B64D 13/006

USPC ........................................................ 188/71.6
See application file for complete search history.

(56) References Cited

U.S. PATENT DOCUMENTS

| 2,821,437 A | | 1/1958 | Lesher | |
| 3,044,736 A | | 7/1962 | Chambers | |
| 4,592,452 A | * | 6/1986 | Merle | F16D 65/847 188/264 AA |
| 4,883,023 A | | 11/1989 | Tsang | |
| 5,445,242 A | * | 8/1995 | Pogorzelski | F16D 55/228 188/264 CC |

(Continued)

FOREIGN PATENT DOCUMENTS

| DE | 4401846 | 7/1995 |
| EP | 3320954 | 5/2018 |

(Continued)

OTHER PUBLICATIONS

European Patent Office, European Search Report dated May 28, 2020 in Application No. 19214542.3.

(Continued)

*Primary Examiner* — Thomas W Irvin
(74) *Attorney, Agent, or Firm* — Snell & Wilmer L.L.P.

(57) ABSTRACT

A system, and associated method, for reducing oxidation of a friction disk may include a braking assembly comprising the friction disk and a coolant loop coupled to the braking assembly, with the coolant loop being configured to circulate liquid coolant from the braking assembly. That is, the coolant loop may be configured to reduce the temperature of the braking assembly, thus reducing the rate/extent of oxidation of the friction disks and potentially enabling the concentration of oxygen around the braking assembly to be reduced.

17 Claims, 9 Drawing Sheets

(56) References Cited

U.S. PATENT DOCUMENTS

| | | | | |
|---|---|---|---|---|
| 6,170,617 | B1* | 1/2001 | Nakamura | B60T 5/00 |
| | | | | 188/264 D |
| 6,419,056 | B1* | 7/2002 | Dyko | B64C 25/36 |
| | | | | 188/264 A |
| 7,255,208 | B2* | 8/2007 | Rea | F16D 65/847 |
| | | | | 188/264 G |
| 7,353,920 | B2* | 4/2008 | Nowak | F16D 65/853 |
| | | | | 188/71.6 |
| 7,546,901 | B1 | 6/2009 | Hall | |
| 8,074,932 | B2* | 12/2011 | Surawski | B64D 37/32 |
| | | | | 244/135 R |
| 8,151,951 | B2* | 4/2012 | Cornolti | F16D 65/847 |
| | | | | 188/264 AA |
| 9,404,806 | B2* | 8/2016 | Miller | F16D 66/00 |
| 9,573,567 | B2* | 2/2017 | Kirkbride | F16D 65/847 |
| 9,623,982 | B2* | 4/2017 | Sharma | B64D 37/32 |
| 10,597,148 | B2* | 3/2020 | Meinel Cheesman | B64C 25/42 |
| 2003/0183454 | A1 | 10/2003 | Hall | |
| 2004/0226438 | A1* | 11/2004 | Jones | B64D 10/00 |
| | | | | 95/45 |
| 2011/0147519 | A1 | 6/2011 | Scott | |
| 2014/0239121 | A1* | 8/2014 | Kirkbride | B60T 5/00 |
| | | | | 244/103 R |
| 2014/0345991 | A1 | 11/2014 | Zywiak et al. | |
| 2016/0200446 | A1* | 7/2016 | Sharma | B64D 13/02 |
| | | | | 62/646 |
| 2016/0206995 | A1* | 7/2016 | Rugg | B01D 53/66 |
| 2016/0356331 | A1 | 12/2016 | Bill | |
| 2017/0129331 | A1 | 5/2017 | Naitou | |
| 2017/0227079 | A1 | 8/2017 | Grazebrook et al. | |
| 2019/0112037 | A1* | 4/2019 | Meinel Cheesman | B64D 13/006 |
| 2019/0301554 | A1* | 10/2019 | Hosamane | G05D 7/0635 |
| 2020/0300321 | A1 | 9/2020 | Cocks | |

FOREIGN PATENT DOCUMENTS

| | | |
|---|---|---|
| FR | 1240454 | 9/1960 |
| GB | 808229 | 1/1959 |
| GB | 2515063 | 12/2014 |
| WO | 2017036766 | 3/2017 |
| WO | 2018088915 | 5/2018 |

OTHER PUBLICATIONS

European Patent Office, European Search Report dated Jun. 18, 2020 in Application No. 19214970.6.

C. Blanco, J. Bermejo, H. Marsh, R. Menendez, Chemical and physical properties of carbon as related to brake performance, Received Jan. 1, 1996; accepted Sep. 16, 1997, Wear 213 (1997) 1-12.

M. Bevilacqua, A. Babutskyi, A. Chrysanthou, A review of the catalytic oxidation of carbonecarbon composite aircraft brakes, School of Engineering and Technology, University of Hertfordshire, College Lane, Hatfield, Herts AL10 9AB, UK, Received May 26, 2015, Received in revised form Aug. 20, 2015, Accepted Aug. 26, 2015 Available online Aug. 29, 2015.

USPTO, Pre-Interview First Office Action dated Dec. 24, 2020 in U.S. Appl. No. 16/259,327.

USPTO, Final Office Action dated Mar. 22, 2021 in U.S. Appl. No. 16/259,327.

* cited by examiner

SYSTEMS AND METHODS FOR REDUCING OXIDATION OF FRICTION DISKS

FIELD

The present disclosure relates to braking assemblies, and more specifically to extending the useable life of friction disks of a braking assembly.

BACKGROUND

Aircraft brake systems typically employ a series of friction disks forced into contact with each other to stop the aircraft. Friction disks splined to a non-rotating wheel axle are interspersed with friction disks splined to the rotating wheel. In response to these interleaved friction disks being pressed together during a braking actuation, significant heat is generated. Due to these high temperatures, friction disks (or at least wear surfaces thereof) are often constructed from carbon-carbon composite materials. While carbon-carbon composites are generally able to withstand the heat, the elevated temperatures of a braking action may cause the carbon-carbon composite material to undergo oxidation, which adversely affects the useable life of the friction disks.

SUMMARY

In various embodiments, the present disclosure provides a system for reducing oxidation of a friction disk. The system may include a braking assembly of a wheel assembly, the braking assembly comprising the friction disk, and a coolant loop coupled in heat exchange communication with the braking assembly. The coolant loop may be configured to circulate liquid coolant such that heat is transferred from the friction disk.

In various embodiments, the braking assembly includes a torque tube, and the torque tube may define at least a portion of the coolant loop. The system may further include a conduit coupled to the braking assembly, with the conduit being in selectable fluid providing communication with the braking assembly. The conduit may be configured to deliver inert fluid to the braking assembly. In various embodiments, the wheel assembly is configured to limit convective ambient airflow around the friction disk of the braking assembly. For example, an outboard wheel portion of a wheel of the wheel assembly may be continuous (e.g., solid, may not have holes/windows) to limit convective ambient airflow around the friction disk of the braking assembly. In various embodiments, the wheel assembly further comprises a heat shield, and the heat shield may be configured to limit ambient airflow around the friction disk of the braking assembly.

In various embodiments, delivery of the inert fluid to the braking assembly via the conduit supplants oxygen in a vicinity of the friction disk to reduce oxidation of the friction disk. In various embodiments, the conduit extends from an inert fluid source to the braking assembly. For example, the inert fluid may comprise a nitrogen-enriched air stream, and the source of the inert fluid may comprise a membrane configured to separate air into a nitrogen-enriched air stream and an oxygen-enriched air stream, according to various embodiments. In various embodiments, delivery of the inert fluid to the braking assembly via the conduit is actuated in response to determining a status of the braking assembly, wherein the status pertains to a likelihood of oxidation of the friction disk.

Also disclosed herein, according to various embodiments, is an aircraft that includes a landing gear having a wheel assembly and a braking assembly operatively coupled to the wheel assembly. The braking assembly includes a friction disk, according to various embodiments, and the system further includes a heat exchanger coupled to the landing gear. Still further, a coolant loop may extend between the braking assembly and the heat exchanger, with the coolant loop conduit being configured to circulate liquid coolant between the braking assembly and the heat exchanger such that heat is transferred from the friction disk, according to various embodiments.

In various embodiments, the aircraft further includes a conduit configured to deliver inert fluid to the braking assembly to supplant oxygen in the vicinity of the friction disk to reduce oxidation of the friction disk. In various embodiments, the aircraft further includes an inert fluid source, with the conduit extending from the inert fluid source to the braking assembly. Still further, the aircraft may include an on-board fuel tank inerting system, with the inert fluid source being the on-board fuel tank inerting system. In various embodiments, the inert fluid includes a nitrogen-enriched air stream and the on-board fuel tank inerting system comprises a membrane configured to separate the nitrogen-enriched air stream from air.

Also disclosed herein, according to various embodiments, is a method for reducing oxidation of a friction disk of a braking assembly of an aircraft. The method may include determining a status of a braking assembly, wherein the status pertains to a likelihood of oxidation of the friction disk of the braking assembly. The method may also include, based on the status of the braking assembly, circulating a liquid coolant to the braking assembly to transfer heat from the friction disk. The method may also include delivering an inert fluid to the braking assembly to reduce oxidation of the friction disk of the braking assembly.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, are systems and methods for reducing oxidation of friction disks of braking assemblies. Generally, the systems and methods include circulating a liquid coolant via a coolant loop to transfer heat from a braking assembly in order to lower the temperature of the friction disks of the braking assembly, thereby reducing the oxidation rate of the friction disks. With liquid cooling of the brake assembly, the wheel/brake assembly may be configured to reduce/limit the convective ambient airflow around the friction disks, which may decrease oxygen exposure to the friction disks, thereby reducing oxidation of the friction disks. The systems and methods may further include delivering inert fluid, such as nitrogen gas or at least a nitrogen-enriched air stream, to the braking assembly in order to further lower the concentration of oxygen in the vicinity of components of the braking assembly that experience elevated temperatures during braking. With liquid cooling and inert fluid delivery, the temperature and oxygen concentration, respectively, are lowered and thus the extent and/or rate of oxidation of the friction disks is greatly reduced, according to various embodiments. While numerous details and examples are included herein pertaining to reducing oxidation of friction disks of aircraft braking assemblies, the scope of the present disclosure is not necessarily limited to aircraft implementations, and thus the present disclosure may be utilized to reduce oxidation of friction disks in other applications.

As used herein, the term "inert fluid" refers to any oxygen-lean stream that, upon being delivered to friction disks, reduces the concentration of the oxygen in the vicinity and thus mitigates oxidation of said friction disks. Accordingly, the term "inert fluid" does not necessarily refer to a noble gas, but instead refers to a fluid stream that supplants oxygen in the vicinity of friction disks, thereby occupying volume that would otherwise have a higher oxygen content, thereby lowering the concentration of oxidant and lowering the rate/extent of oxidation. Said differently, the term "inert fluid" refers to a fluid stream that has less than 20%, by volume, of oxygen.

Figure 1:
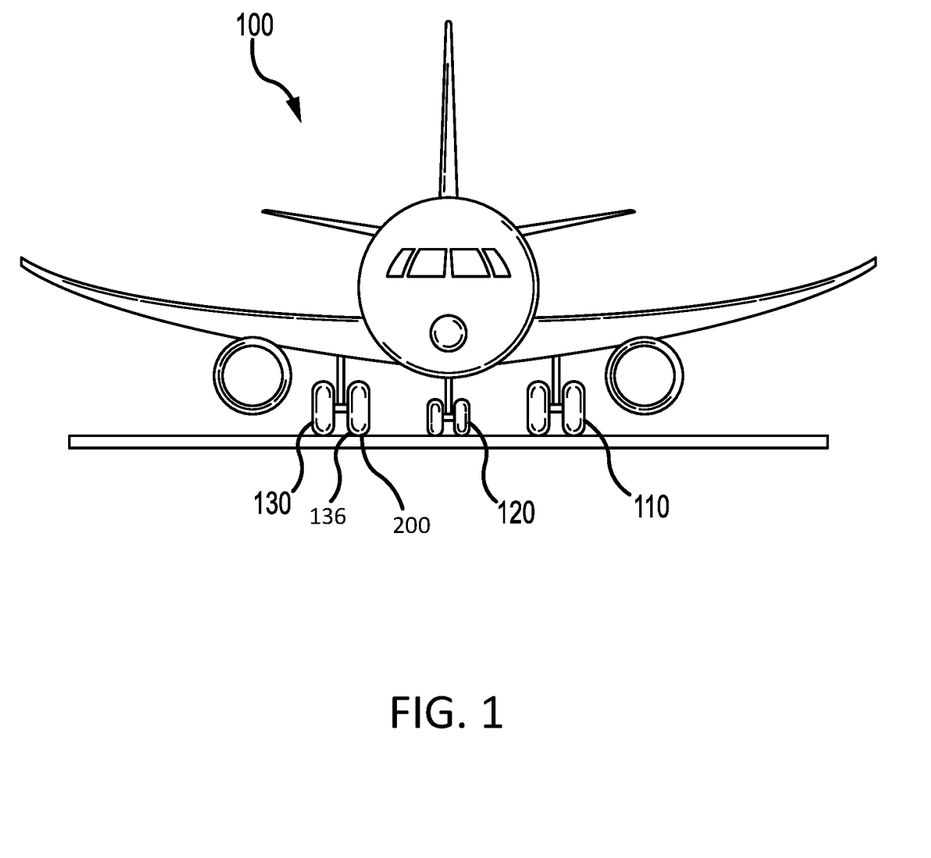
FIG. 1 illustrates an aircraft, in accordance with various embodiments.

In various embodiments, and with reference to FIG. 1, an aircraft 100 is provided. The aircraft 100 may include multiple landing gear, such as a first landing gear 110, a second landing gear 120 and a third landing gear 130. The landing gear may include one or more wheel assemblies 200 (FIG. 1). For example, the third landing gear 130 may include an inner/inboard wheel assembly and an outer/outboard wheel assembly. The aircraft may also include one or more braking assemblies at each wheel assembly. The braking assembly, as described in greater detail below with reference to FIGS. 2A and 2B, may generally include a plurality of interleaved friction disks that may be actuated to exert a braking force to decelerate and/or stop the aircraft 100. Each wheel assembly of the aircraft 100 may be designed to receive a tire. For example, a tire 136 may be placed about an outer circumference of wheel assembly 200.

Figure 2A:
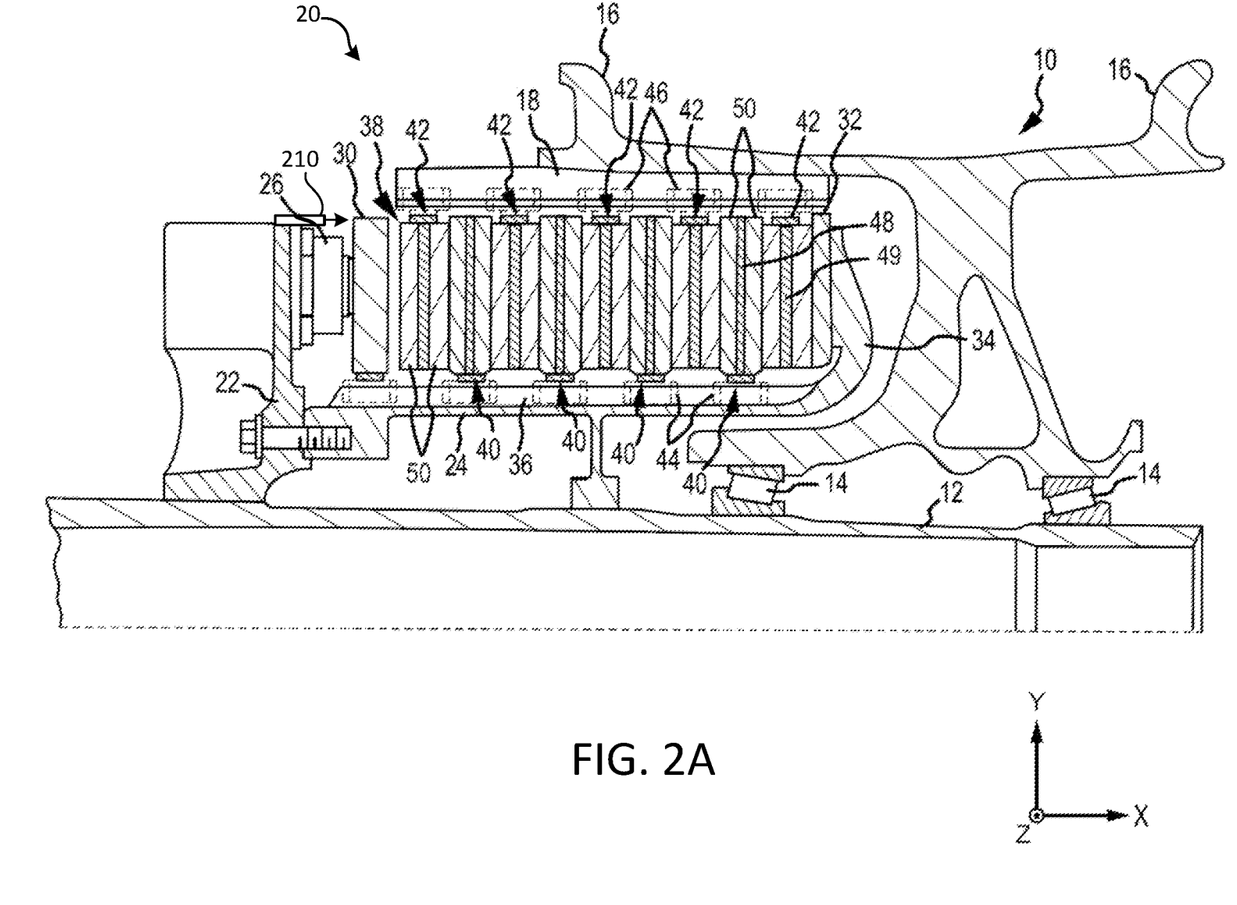
FIG. 2A illustrates a cross-sectional view of a multi-disk brake system having a conduit for delivering inert fluid, in accordance with various embodiments.
Figure 2B:
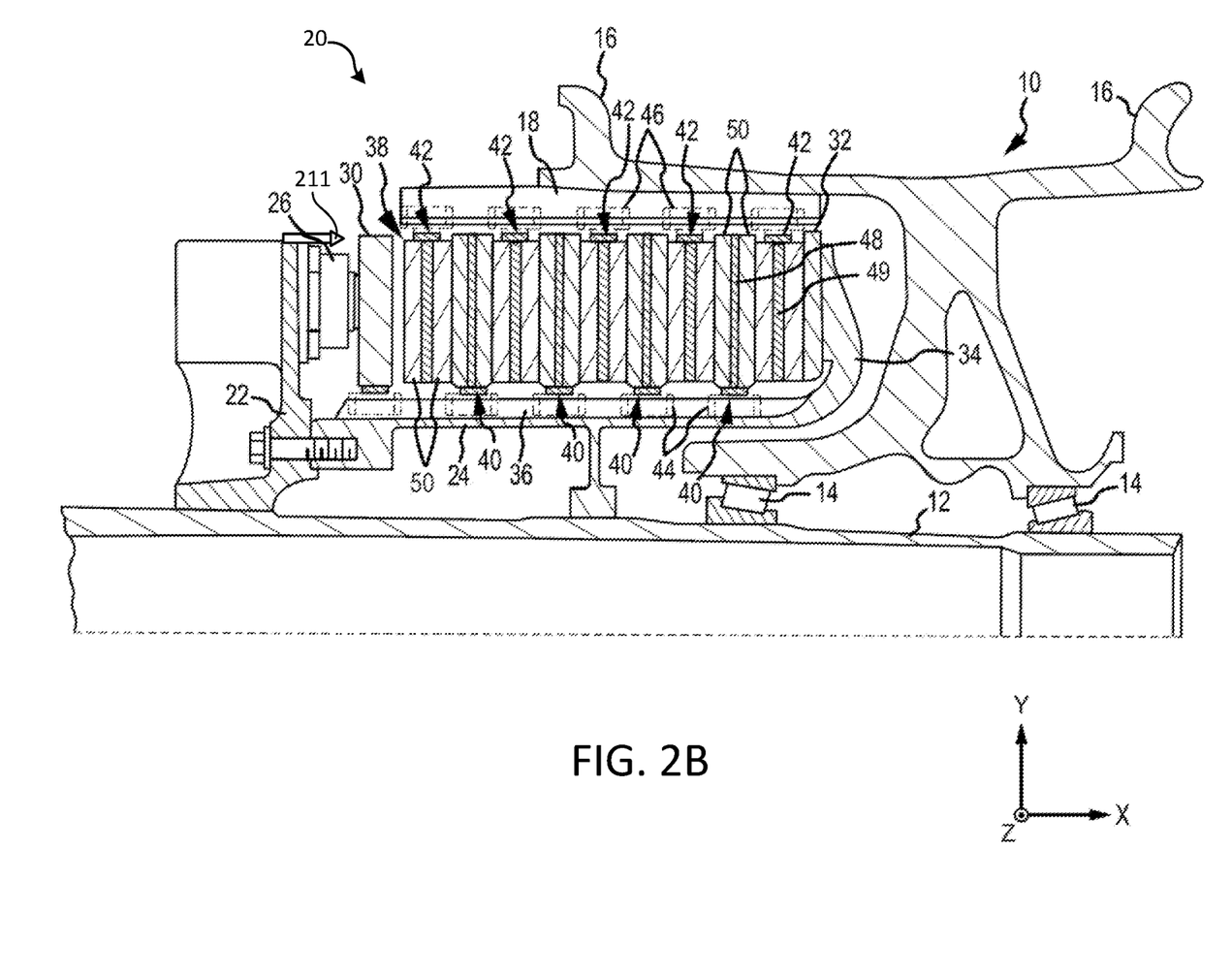
FIG. 2B illustrates a cross-sectional view of a multi-disk brake system having a conduit for delivering inert fluid, in accordance with various embodiments.

Referring to FIGS. 2A and 2B, a multi-disk braking assembly 20 is illustrated according to various embodiments. The braking assembly may be operatively mounted to the wheel assembly/landing gear of the aircraft 100. The braking assembly 20 may include a wheel 10 supported for rotation around axle 12 by bearings 14. Axle 12 defines an axis of multi-disk braking assembly 20 and the various components thereof described herein, and any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk braking assembly 20. Multi-disk braking assembly 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIGS. 2A and 2B, or attached as separate components.

Multi-disk braking assembly 20 also includes a plurality of friction disks 38. Each friction disk 38 may comprise a friction disk core. The plurality of friction disks 38 includes at least one friction disk with a non-rotatable core, also known as a stator 40, and at least one friction disk with a rotatable core, also known as a rotor 42. Stators 40 and rotors 42 may be located adjacent to one another in multi-disk braking assembly 20, forming a plurality of adjacent stator-rotor pairs. Stators 40 may comprise a stator core 48 and wear liners 50. Rotors 42 may comprise a rotor core 49 and wear liners 50. Each friction disk 38 includes an attachment structure. In the embodiment of FIGS. 2A and 2B, each of the four stators 40 includes a plurality of stator lugs 44 at circumferentially spaced positions around stator 40 as an attachment structure. Similarly, each of the five rotors 42 includes a plurality of rotor lugs 46 at circumferentially spaced positions around rotor 42 as an attachment structure. In the embodiment of FIGS. 2A and 2B, pressure plate 30, end plate 32, and friction disks 38 are all annular structures made at least partially from a carbon composite material.

Torque flange 22 may be mounted to axle 12. Torque tube 24 is bolted to torque flange 22 such that reaction plate 34 is near an axial center of wheel 10. End plate 32 is connected to a surface of reaction plate 34 facing axially inward. Thus, end plate 32 is non-rotatable by virtue of its connection to torque tube 24. Stator splines 36 support pressure plate 30 so that pressure plate 30 is also non-rotatable. Stator splines 36 also support stators 40 via stator cores 48. Stator cores 48 engage stator splines 36 with gaps formed between stator lugs 44. Similarly, rotors 42 engage rotor splines 18 via rotor core 49 with gaps formed between rotor lugs 46. Thus, rotor cores 49 of rotors 42 are rotatable by virtue of their engagement with rotor splines 18 of wheel 10.

As shown in FIGS. 2A and 2B, rotors 42 with rotor cores 49 are arranged with end plate 32 on one end, pressure plate 30 on the other end, and stators 40 with stator cores 48 interleaved so that rotors 42 with rotor cores 49 are directly or indirectly adjacent to non-rotatable friction components. Pistons 26 are connected to torque flange 22 at circumferentially spaced positions around torque flange 22. Pistons 26 face axially toward wheel 10 and contact a side of pressure plate 30 opposite friction disks 38. Pistons 26 may be powered electrically, hydraulically, or pneumatically. In various embodiments, the torque tube 24 and/or torque flange 22 is secured to a static (non-rotating) structure, such as a bogie beam or a landing gear strut.

In various embodiments, in response to actuation of pistons 26, a force, towards reaction plate 34, is exerted on the rotatable friction disks 42 and the non-rotatable friction disks 40. The rotatable friction disks 42 and the non-rotatable friction disks 40 may thus be pressed together between pressure plate 30 and end plate 32. This compression of the friction disks during a braking action often generates substantial heat. While frictions disks, or at least wear liners of friction disks, may be made from a material that is capable of withstanding the heat, such as carbon-carbon composite materials, the elevated temperature of the friction disks may render the disks susceptible to oxidation, which would reduce the useable life of the friction disks. Accordingly, the system and methods described below are configured to mitigate/reduce oxidation of the friction disks. Generally, systems and methods for delivering inert fluid to the braking assembly to mitigate oxidation are described with reference to FIGS. 2A, 2B, 3, 4, and 5, systems and methods for circulating liquid coolant to the braking assembly to mitigate oxidation are described with reference to FIGS. 6A, 7, and 9A, and systems and methods that include both of these concepts are described with reference to FIGS. 6B, 8, and 9B.

Figure 3:
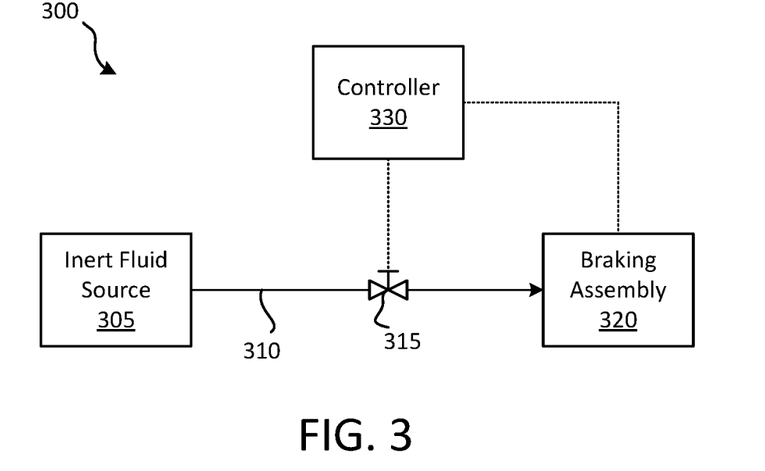
FIG. 3 is a schematic block diagram of a system for reducing oxidation of friction disks of a braking assembly, in accordance with various embodiments.

In various embodiments, and with reference to FIG. 3, a system 300 for reducing oxidation of a friction disk is provided. The system 300 may include a braking assembly 320 (e.g., braking assembly 20 of FIGS. 2A and 2B) and a conduit 310 configured to deliver inert fluid to the braking assembly 320 to reduce/mitigate oxidation of the braking assembly 320. More specifically, the braking assembly 320 may include a plurality of friction disks, and the conduit 310 may be configured to direct the inert fluid to the friction disks such that the rate/extent of oxidation is mitigated. Oxidation reduction occurs because delivery of the inert fluid to the braking assembly 320 via the conduit 310 supplants oxygen in a vicinity of the friction disk to reduce the concentration of oxidant around the friction disk, thereby at least reducing the rate/extent of oxidation. For example, FIG. 2A shows a conduit 210, which may be similar to conduit 310 of FIG. 3, that is coupled to the braking assembly 20 and that delivers inert fluid to the friction disks. In various embodiments, the conduit may include a nozzle 211 (FIG. 2B) that is coupled or otherwise mounted to the braking assembly 20. For example, the nozzle 211 may be coupled to torque flange 22. In various embodiments, the conduit/nozzle may extend through or be disposed along the torque tube 24 and may be configured to disperse fluid directly to the volume around the friction disks. In various embodiments, the braking assembly 20 may include a plurality of nozzles/conduits that are circumferentially distributed around the torque flange 22 so as to be able to equally distribute the inert fluid.

In various embodiments, the inert fluid may be nitrogen gas or other conventional inert fluids, such as helium, neon, argon. For example, the inert fluid may be a nitrogen-enriched air stream comprising less than 20 volume % of oxygen. In various embodiments, the inert fluid has a volume percent of oxygen of less than 15%. In various embodiments, the oxygen content in the inert fluid is less than 10 volume percent. However, as mentioned above, the inert fluid may not be a conventional inert gas (e.g., may not be a noble gas), and instead the inert fluid may be a fluid stream that has a reduced oxygen content. For example, carbon dioxide gas may serve as the inert fluid, at least under certain operating conditions (e.g., within certain temperature thresholds).

In various embodiments, the system 300 further includes a valve 315, a controller 330, and/or an inert fluid source 305. The inert fluid source 305 may be a storage vessel that holds inert fluid, or the inert fluid source 305 may generate inert fluid on-board the aircraft. For example, the inert fluid source 305 may comprise a membrane configured to separate air into an oxygen-enriched air stream and a nitrogen-enriched air stream, and the nitrogen-enriched air stream may be directed through the conduit 310 to the braking assembly 320. In various embodiments, the inert fluid source 305 may include an on-board inert gas generator specifically configured to provide inert fluid to the brake assembly to reduce oxidation. Additional details pertaining to on-board generation are included below with reference to FIG. 4.

The controller 330 is coupled in control providing communication with valve 315 disposed in the conduit 310, according to various embodiments. Generally, the controller 330 is configured to selectively control delivery of the inert fluid to the braking assembly. For example, delivery of the inert fluid to the braking assembly 320 via the conduit 310 may be actuated in response to determining a status of the braking assembly 320 (e.g., based on input and/or feedback from various sensors or other devices of the aircraft), wherein the status of the braking assembly 320 pertains to a likelihood of oxidation of the friction disk. Additional details pertaining to this determining step are provided below with reference to FIG. 5.

The controller 330 may be integrated into computer systems onboard aircraft such as, for example, a brake control unit (BCU), a full authority digital engine control (FADEC), an engine-indicating and crew-alerting system (EICAS), and/or the like. The controller 330 may also be a standalone computer system separate from aircraft and in electronic communication with aircraft, as described in further detail herein. The controller 330 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor of the controller 330 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 4:
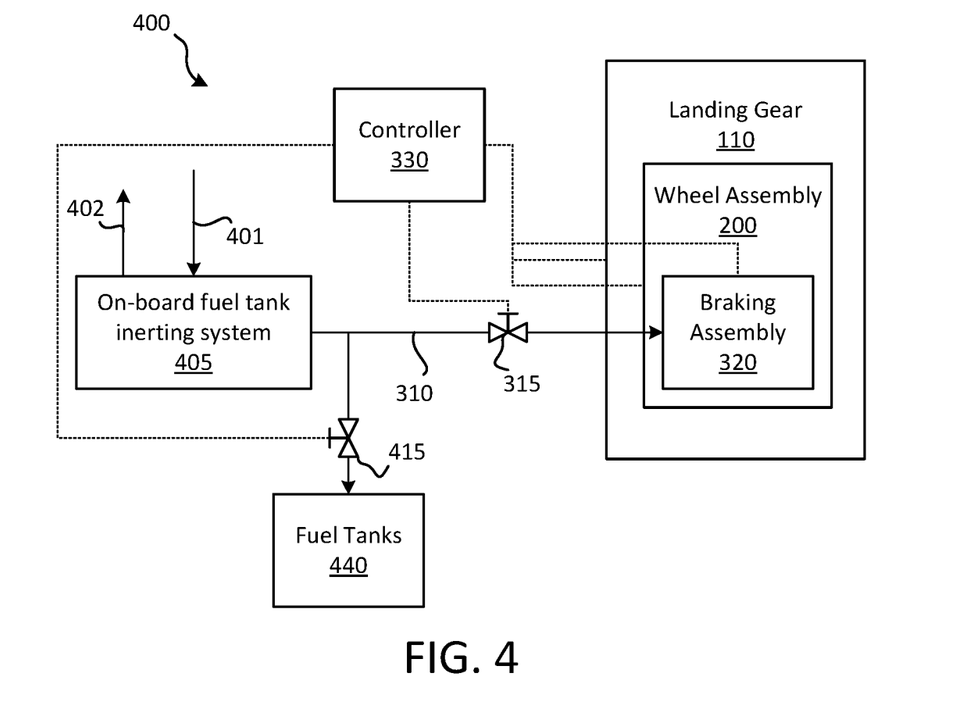
FIG. 4 is a schematic block diagram of an aircraft with a conduit for reducing oxidation of friction disks of a braking assembly, in accordance with various embodiments.

In various embodiments, and with reference to FIG. 4, a schematic block diagram of a portion of an aircraft 400 is provided. The aircraft 400 may include various components described above with reference to FIG. 3. The aircraft 400, according to various embodiments, also includes a landing gear 110, a wheel assembly 200 coupled to landing gear 110, and the braking assembly 320 coupled to the wheel assembly 200. In the aircraft 400, the inert fluid source 305 may be an on-board fuel tank inerting system 405 (also referred to herein simply as the "inerting system 405"). The on-board fuel tank inerting system 405 may generally be configured to provide inert gas, such as nitrogen gas, to the fuel tanks 440 of the aircraft 400 in order to keep the environment within the fuel tanks 440 below combustion levels as fuel is consumed. For example, the inerting system 405 may receive air through an inlet 401, and then may separate the air (e.g., using a membrane or other separator) to produce an oxygen rich stream and an oxygen lean stream. The oxygen rich stream may be routed through outlet 402 while the oxygen lean stream (e.g., less than 20 volume % of oxygen) may be routed through conduit 310.

In various embodiments, the inert fluid used to inert the fuel tanks 440 may be selectively directed, by actuating valve 315 and/or valve 415, to flow to the braking assembly 320 to reduce oxidation thereof. That is, the controller 330 may be configured to actively route all, or a portion of, the inert fluid intended for the fuel tanks 440 to instead flow to the braking assembly 320. As described in greater detail below with reference to FIG. 5, delivery of the inert fluid to the braking assembly 320 via the conduit 310 may be actuated in response to determining a status of the braking assembly, with the status of the braking assembly pertaining to a likelihood of oxidation of the friction disk. For example, the status may be a threshold aircraft speed, a threshold aircraft deceleration, a threshold temperature of the braking assembly, a threshold braking force, and/or an aircraft landing event, according to various embodiments.

In various embodiments, the conduit 310 may extend from the inert fluid source to one or all of the landing gear of an aircraft. In various embodiments, the conduit 310 includes various ducts or other passageways to help direct the inert gas from the source to the landing gear. In various embodiments, the conduit 310 extends through aircraft spaces, such as one or more cargo bays, through the fuselage, and/or through the wings of the aircraft to wing landing gear. In various embodiments, the outlet of the conduit 310 may include one or more nozzles configured to further control the direction and speed of the inert fluid delivered to the braking assembly.

Figure 5:
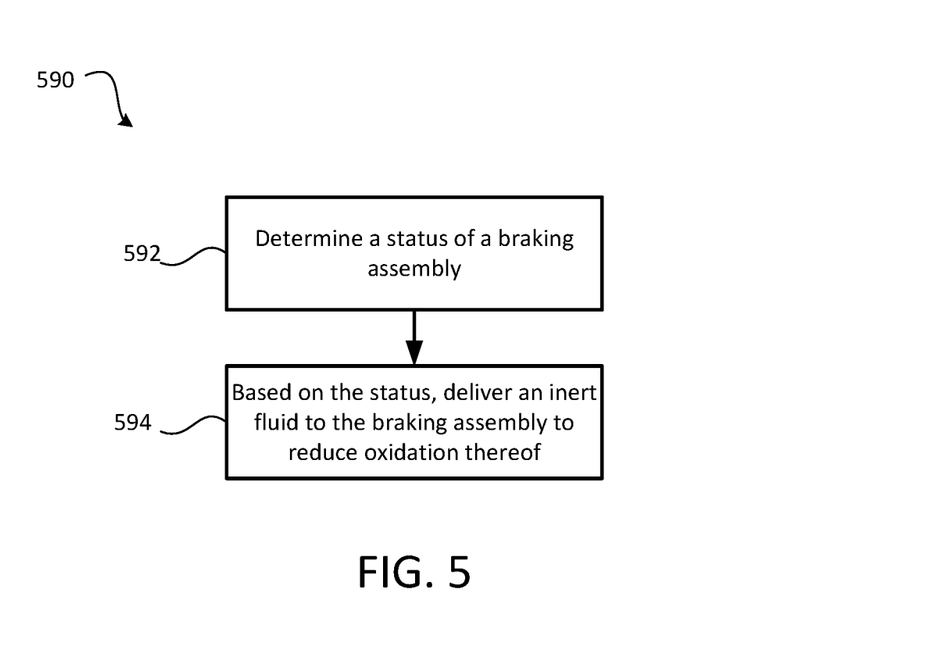
FIG. 5 is a schematic flow chart diagram of a method for reducing oxidation of friction disks of a braking assembly, in accordance with various embodiments.

In various embodiments, and with reference to FIG. 5, a method 590 for reducing oxidation of a friction disk of a braking assembly of an aircraft is provided. The method 590 may include determining a status of a braking assembly at step 592 and, based on the status of the braking assembly, delivering an inert fluid to the braking assembly to reduce oxidation of the friction disk of the braking assembly at step 594. The status of the braking assembly may generally pertain to a likelihood of oxidation of the friction disk of the braking assembly. Said differently, the determined status of the braking assembly may be a detected, sensed, or calculated condition of the aircraft that is indicative of whether oxidation would occur if not for delivery of the inert fluid using the system and components described above.

In various embodiments, determining the status of the braking assembly is performed by a controller of an aircraft control system of the aircraft. In various embodiments, determining the status of the braking assembly comprises determining if an aircraft speed meets a threshold aircraft speed. In various embodiments, determining the status of the braking assembly comprises determining if an aircraft deceleration meets a threshold aircraft deceleration. In various embodiments, determining the status of the braking assembly comprises determining if a temperature of the braking assembly meets a threshold temperature of the braking assembly. In various embodiments, wherein determining the status of the braking assembly comprises determining if a braking force meets a threshold braking force. In various embodiments, determining the status of the braking assembly comprises determining a landing event of the aircraft.

Figure 7:
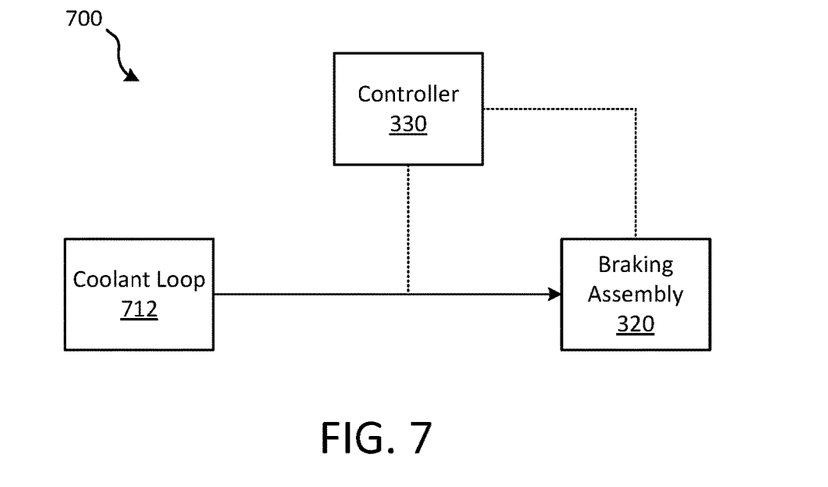
FIG. 7 is a schematic block diagram of a system for reducing oxidation of friction disks of a braking assembly, in accordance with various embodiments.
Figure 8:
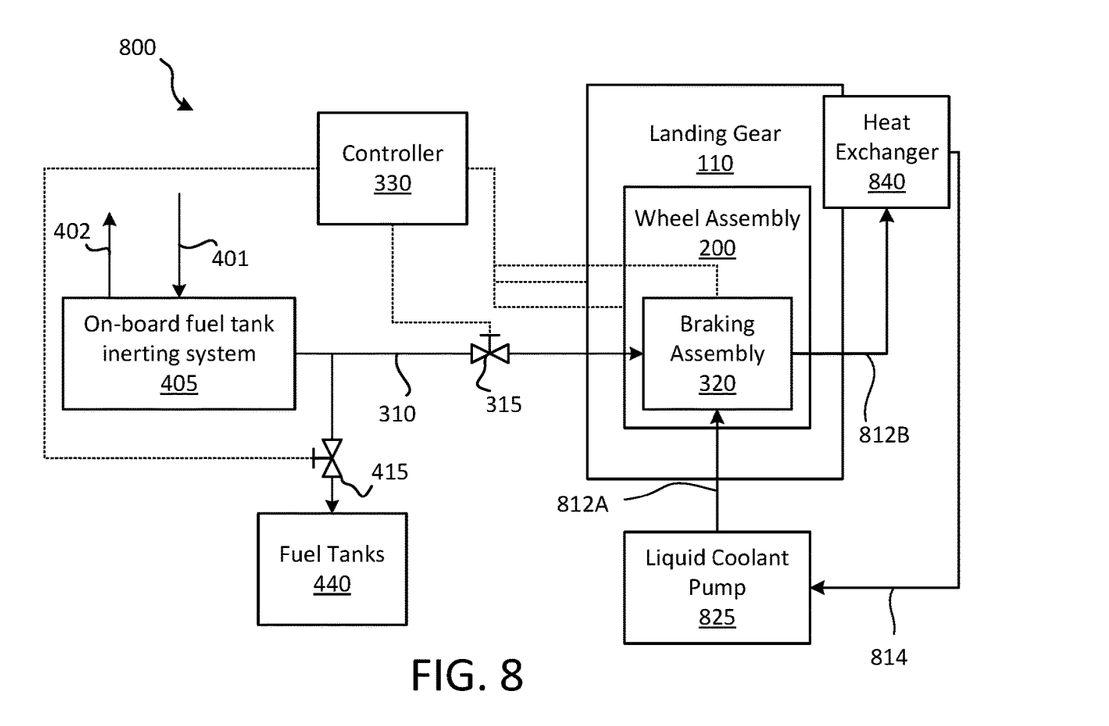
FIG. 8 is a schematic block diagram of an aircraft with a coolant loop and a conduit for reducing oxidation of friction disks of a braking assembly, in accordance with various embodiments.

In various embodiments, and with reference to FIG. 7, a system 700 for reducing oxidation of a friction disk is provided. The system 700 may include a braking assembly 320 (e.g., braking assembly 20 of FIGS. 2A and 2B) and a coolant loop 712 configured to circulate liquid coolant to the braking assembly 320 to transfer heat from the braking assembly 320 (i.e., from the friction disks of the braking assembly 320), thereby reducing/mitigating oxidation of the friction disks of the braking assembly 320. More specifically, the coolant loop 712 is coupled in heat exchange communication with the braking assembly 320 and is configured to reduce the temperature of the braking assembly, according to various embodiments. The system 700 may include a pump for circulating the liquid coolant, or the liquid coolant may be driven by natural circulation.

Figure 6A:
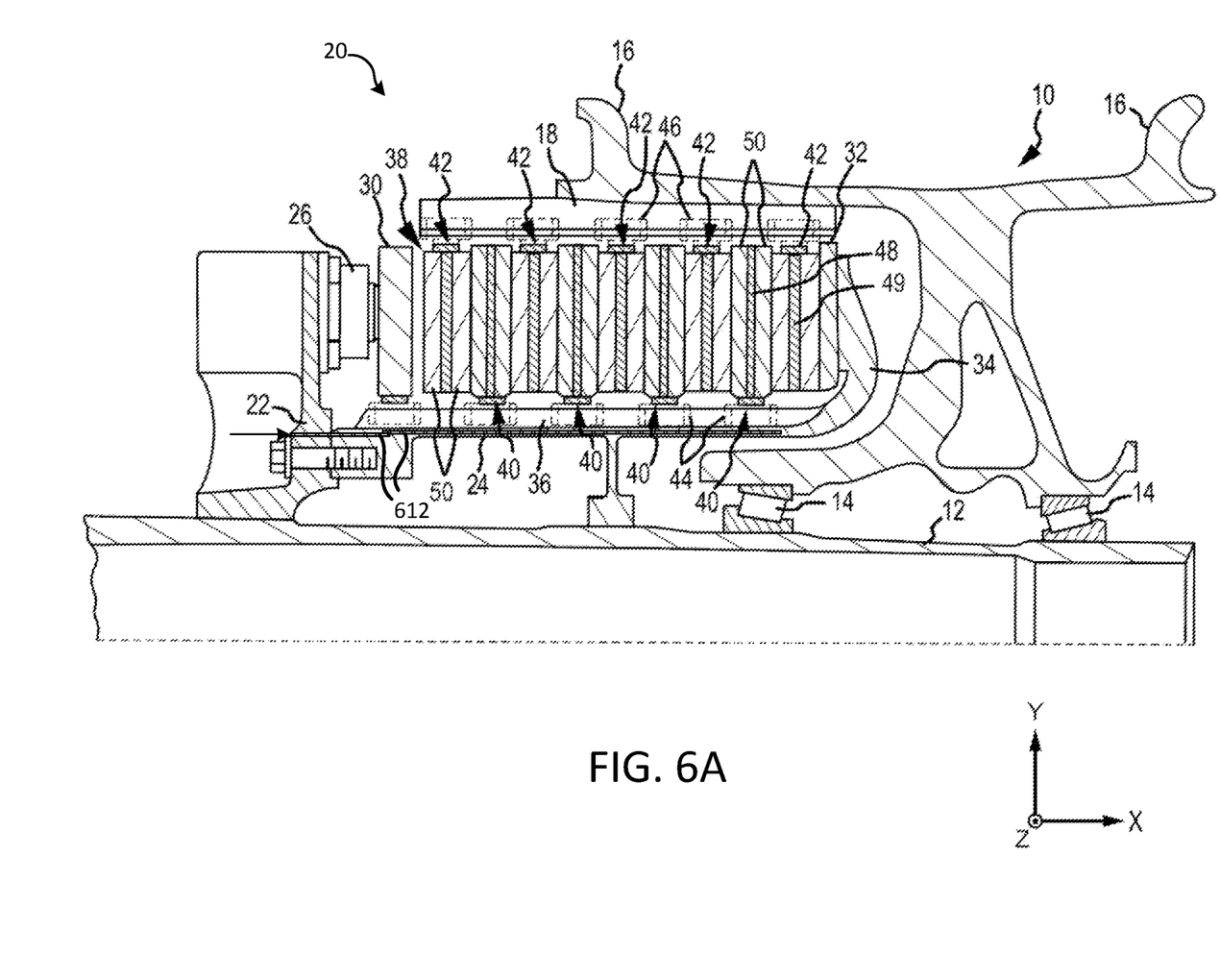
FIG. 6A illustrates a cross-sectional view of a multi-disk brake system having a coolant loop for transferring heat from the friction disk, in accordance with various embodiments.

In various embodiments, and with reference to FIG. 6A, at least a portion of the coolant loop 612 may be defined by the torque tube 24. That is, the torque tube 24 may define one or more liquid coolant lines (e.g., channels) that are configured to circulate liquid coolant through the torque tube 24 to transfer heat from the torque tube 24 (e.g., away from the friction disks). In various embodiments, the coolant loop may provide 612 sufficient cooling such that the braking assembly 20 is configured to limit convective ambient airflow around and in the vicinity of the friction disks of the braking assembly. For example, an outboard wheel portion of a wheel 10 of the wheel assembly (e.g., the rim or disk of the wheel 10) may be continuous (e.g., may not have holes/windows), thereby limiting convective ambient airflow around the friction disks of the braking assembly. In various embodiments, a heat shield of the wheel/brake assembly may be configured to limit ambient airflow around and in the vicinity of the friction disks. By limiting the convective ambient airflow, the rate/extent of oxygen exposure to the friction disks may decrease, which can reduce the rate/extent of oxidation. Further, the oxidation rate may be further reduced by delivering an inert fluid to the braking assembly 20. Additional details pertaining to using both the inert fluid delivery concept and the liquid cooling concept are provided below with reference to FIGS. 6B, 8, and 9B.

In various embodiments, and with reference to FIG. 7, the controller 330 is coupled in control providing communication with the coolant loop 712. Generally, the controller 330 is configured to selectively control circulation of the liquid coolant to/from the braking assembly 320. For example, circulation of the liquid coolant may be actuated in response to determining a status of the braking assembly 320 (e.g., based on input and/or feedback from various sensors or other devices of the aircraft), wherein the status of the braking assembly 320 pertains to a likelihood of oxidation of the friction disk, as described above with reference to FIG. 5.

Figure 9A:
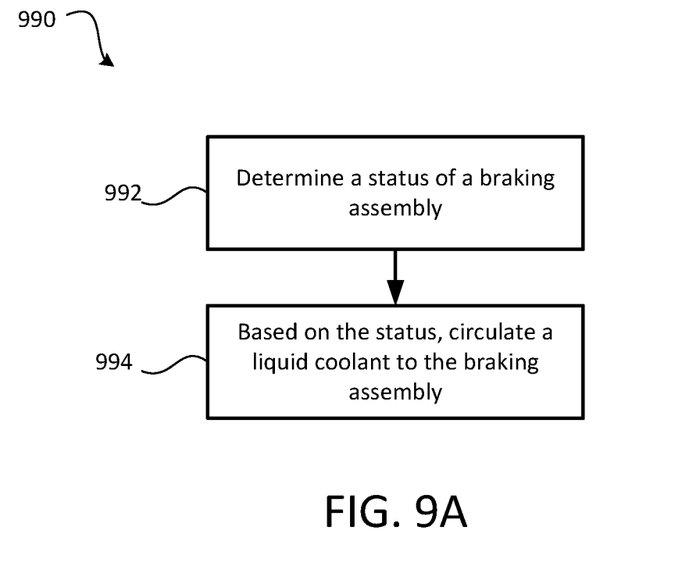
FIG. 9A is a schematic flow chart diagram of a method for reducing oxidation of friction disks of a braking assembly, in accordance with various embodiments.

In various embodiments, and with reference to FIG. 9A, a method 990 for reducing oxidation of a friction disk of a braking assembly of an aircraft is provided. The method 990 may include determining a status of a braking assembly at step 992 and, based on the status of the braking assembly, circulating a liquid coolant to the braking assembly at step 994. The status of the braking assembly may generally pertain to a likelihood of oxidation of the friction disk of the braking assembly. Said differently, the determined status of the braking assembly may be a detected, sensed, or calculated condition of the aircraft that is indicative of whether oxidation would occur if not for delivery of the inert fluid using the system and components described above.

In various embodiments, determining the status of the braking assembly (step 992) is performed by a controller of an aircraft control system of the aircraft. In various embodiments, determining the status of the braking assembly comprises determining if an aircraft speed meets a threshold aircraft speed. In various embodiments, determining the status of the braking assembly comprises determining if an aircraft deceleration meets a threshold aircraft deceleration. In various embodiments, determining the status of the braking assembly comprises determining if a temperature of the braking assembly meets a threshold temperature of the braking assembly. In various embodiments, wherein determining the status of the braking assembly comprises determining if a braking force meets a threshold braking force. In various embodiments, determining the status of the braking assembly comprises determining a landing event of the aircraft.

Figure 6B:
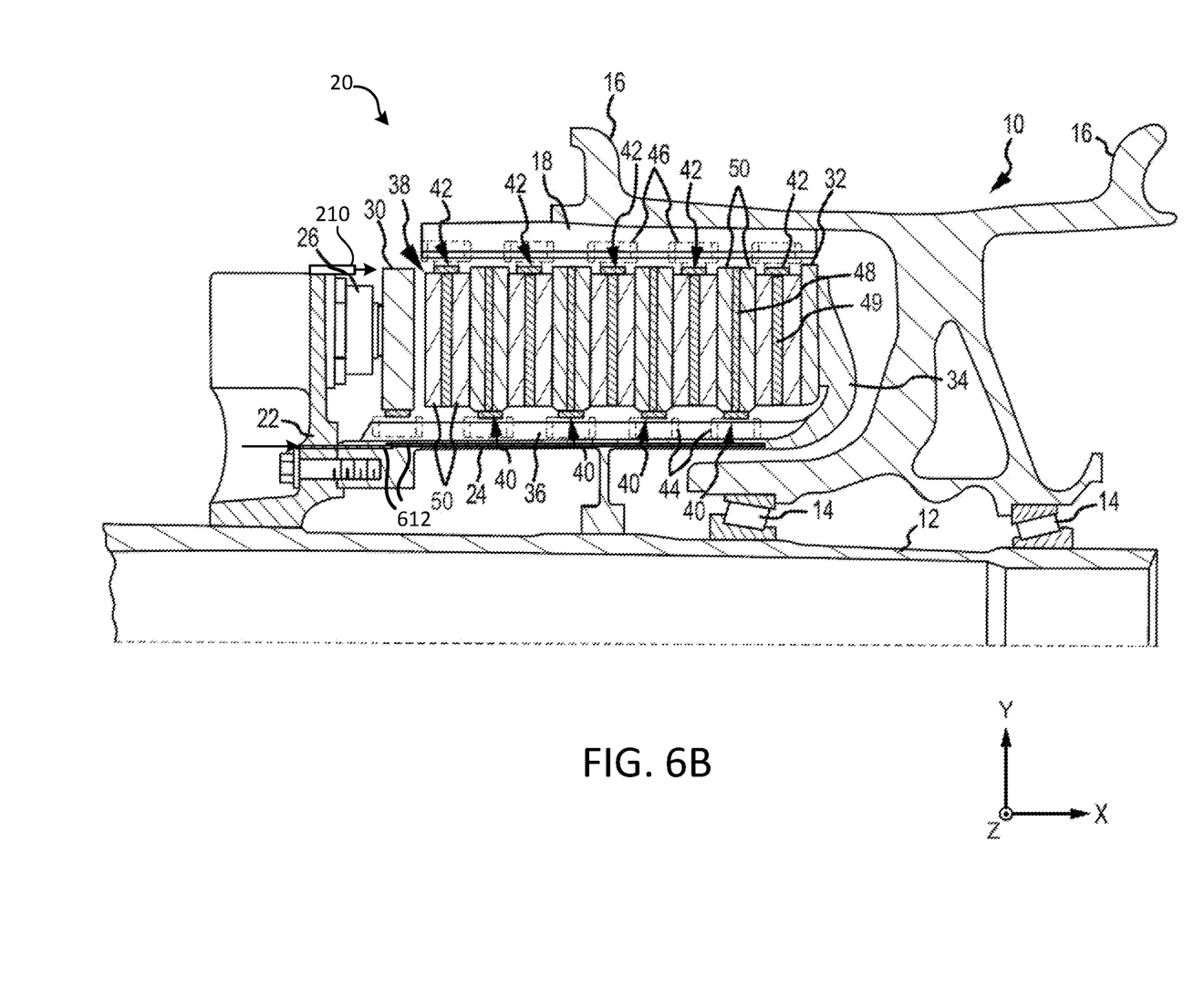
FIG. 6B illustrates a cross-sectional view of a multi-disk brake system having a coolant loop for transferring heat from the friction disk and a conduit for delivering inert fluid, in accordance with various embodiments.

In various embodiments, and with reference to FIG. 6B, the coolant loop 612 may be utilized in conjunction with conduit 210 (described above with reference to FIGS. 2A and 2B) coupled to the braking assembly 20 (e.g., mounted to the torque flange, the torque tube, or other non-rotating structure) to deliver inert fluid to the friction disks. For example, and with reference to the schematic block diagram of the aircraft 800 of FIG. 8, the aircraft 800 may include the various components described above with reference to FIG. 4 and FIG. 7. That is, the aircraft 800, according to various embodiments, includes heat exchanger 840 coupled to the landing gear 110 (e.g., mounted to a strut of the landing gear 110). The heat exchanger 840 may form part of the coolant loop. That is, the coolant loop may include a liquid coolant pump 825 that drives circulation through supply line 812A to deliver liquid coolant to the braking assembly 320. The coolant loop may further include line 812B that delivers liquid coolant from the braking assembly to the heat exchanger 840. The heat exchanger 840 may be air-cooled and may thus transfer heat from the brakes to the ambient air. The coolant loop may further include a return line 814 configured to return liquid coolant to the pump 825 for recirculation. The liquid coolant may be a Paratherm™ GLT fluid, Therminol® 66, or other such coolant liquids.

Figure 9B:
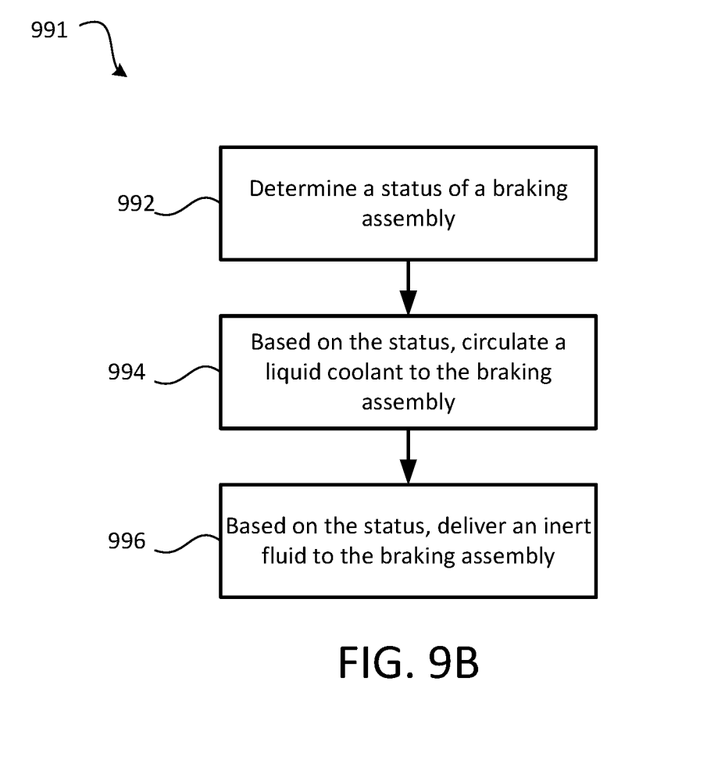
FIG. 9B is a schematic flow chart diagram of a method for reducing oxidation of friction disks of a braking assembly, in accordance with various embodiments.

In various embodiments, and with reference to FIG. 9B, the method 991 for reducing oxidation of a friction disk of a braking assembly further includes, based on the status of the braking assembly determined at step 992, delivering an inert fluid to the braking assembly at step 996. Thus, the method 991 may include both step 994 (reducing the temperature of the friction disks) and step 996 (reducing concentration of oxygen in the vicinity of the friction disks).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for reducing oxidation of a friction disk, the system comprising:
   a braking assembly of a wheel assembly, the braking assembly comprising a torque tube and the friction disk; and
   a coolant loop coupled in heat exchange communication with the braking assembly, wherein the coolant loop is configured to circulate liquid coolant such that heat is transferred from the friction disk to the liquid coolant, wherein the coolant loop comprises:
      a supply line configured to deliver the liquid coolant to a coolant channel defined by the braking assembly, wherein the torque tube defines at least a portion of the coolant channel; and
      an outlet line configured to deliver the liquid coolant away from the coolant channel of the braking assembly.

2. The system of claim 1, wherein the system further comprises a conduit coupled in selectable fluid providing communication with the braking assembly, wherein the conduit is configured to deliver inert fluid to the braking assembly.

3. The system of claim 2, wherein the wheel assembly is configured to limit convective ambient airflow around the friction disk of the braking assembly.

4. The system of claim 3, wherein an outboard wheel portion of a wheel of the wheel assembly is continuous to limit convective ambient airflow around the friction disk of the braking assembly.

5. The system of claim 3, wherein the wheel assembly further comprises a heat shield, wherein the heat shield is configured to limit ambient airflow around the friction disk of the braking assembly.

6. The system of claim 2, wherein the inert fluid comprises a nitrogen-enriched air stream and an inert fluid source comprises a membrane configured to separate the nitrogen-enriched air stream from air.

7. The system of claim 6, wherein delivery of the nitrogen-enriched air stream to the braking assembly via the conduit is actuated in response to determining a status of the braking assembly, wherein the status pertains to a likelihood of oxidation of the friction disk.

8. An aircraft comprising:
   a landing gear comprising a wheel assembly;
   a braking assembly operatively coupled to the wheel assembly of the landing gear, the braking assembly comprising a friction disk;
   a heat exchanger coupled to the landing gear; and
   a coolant loop extending between the braking assembly and the heat exchanger, wherein the coolant loop is configured to circulate liquid coolant between the braking assembly and the heat exchanger such that heat is transferred from the friction disk to the liquid coolant, wherein the coolant loop comprises a liquid coolant pump configured to drive circulation of the liquid coolant.

9. The aircraft of claim 8, wherein the braking assembly comprises a torque tube, wherein the torque tube defines at least a portion of the coolant loop.

10. The aircraft of claim 9, wherein the heat exchanger is mounted to a strut of the landing gear.

11. The aircraft of claim 8, wherein the aircraft further comprises a conduit coupled in selectable fluid providing communication with the braking assembly, wherein the conduit is configured to deliver inert fluid to the braking assembly.

12. The aircraft of claim 11, wherein the wheel assembly is configured to limit convective ambient airflow around the friction disk of the braking assembly.

13. The aircraft of claim 12, wherein an outboard wheel portion of a wheel of the wheel assembly is continuous to limit convective ambient airflow around the friction disk of the braking assembly.

14. The aircraft of claim 12, wherein the wheel assembly further comprises a heat shield, wherein the heat shield is configured to limit ambient airflow around the friction disk of the braking assembly.

15. The aircraft of claim 11, wherein the inert fluid comprises a nitrogen-enriched air stream and an inert fluid source comprises a membrane configured to separate the nitrogen-enriched air stream from air.

16. The aircraft of claim 15, further comprising an on-board fuel tank inerting system, wherein the inert fluid source is the on-board fuel tank inerting system.

17. The aircraft of claim 16, wherein delivery of the nitrogen-enriched air stream to the braking assembly via the conduit is actuated in response to determining a status of the braking assembly, wherein the status pertains to a likelihood of oxidation of the friction disk.

* * * * *